United States Patent
Patel et al.

(10) Patent No.: US 10,561,273 B2
(45) Date of Patent: Feb. 18, 2020

(54) FOOD COOKING APPLIANCE UTILIZING BOTH STEAM AND HEAT FOR RAPIDLY COOKING FOOD PRODUCTS

(71) Applicants: Bhupendra R. Patel, Carol Stream, IL (US); Dipan Patel, Hoffman Estates, IL (US); Jignesh Patel, Bartlett, IL (US); Francisco Vega, Chicago, IL (US)

(72) Inventors: Bhupendra R. Patel, Carol Stream, IL (US); Dipan Patel, Hoffman Estates, IL (US); Jignesh Patel, Bartlett, IL (US); Francisco Vega, Chicago, IL (US)

(73) Assignee: A. J. ANTUNES & CO., Carol Stream, IL (US)

( * ) Notice: Subject to any disclaimer, the term of this patent is extended or adjusted under 35 U.S.C. 154(b) by 438 days.

(21) Appl. No.: 15/393,839

(22) Filed: Dec. 29, 2016

(65) Prior Publication Data
US 2018/0184835 A1 Jul. 5, 2018

(51) Int. Cl.
| | |
|---|---|
| A47J 36/06 | (2006.01) |
| A47J 36/04 | (2006.01) |
| A47J 37/07 | (2006.01) |
| A47J 27/00 | (2006.01) |
| A47J 37/06 | (2006.01) |
| A47J 27/04 | (2006.01) |

(52) U.S. Cl.
CPC .............. *A47J 36/06* (2013.01); *A47J 27/004* (2013.01); *A47J 36/04* (2013.01); *A47J 37/06* (2013.01); *A47J 37/07* (2013.01); *A47J 2027/043* (2013.01)

(58) Field of Classification Search
CPC .......... A47J 36/06; A47J 27/004; A47J 36/04; A47J 37/06; A47J 37/07; A47J 2027/043
USPC ........ 99/303, 330, 355, 339, 340, 401, 419, 99/422, 441, 447, 448; 426/505, 510, 426/511, 523, 614
See application file for complete search history.

(56) References Cited

U.S. PATENT DOCUMENTS

| | | | | |
|---|---|---|---|---|
| 2006/0191915 | A1* | 8/2006 | Kanzaki | F24C 15/003 219/682 |
| 2010/0098825 | A1* | 4/2010 | Veltrop | A47J 37/0623 426/505 |

* cited by examiner

*Primary Examiner* — Phuong T Nguyen
(74) *Attorney, Agent, or Firm* — Law Offices of Steven W. Weinrieb

(57) ABSTRACT

A food cooking appliance which utilizes both steam and heat for rapidly cooking food products is disclosed. The food products are disposed within food containers which are effectively formed as openings within one or more plates or templates, wherein the openings may have different geometrical configurations and size dimensions, and the one or more plates or templates are pivotally movable between upper or raised non-cooking positions and lower cooking positions at which the food products, disposed within the openings, are disposed atop one or more heated grills or platens. One or more covers are also utilized to cover the plates or templates such that the food products are cooked within covered cooking chambers. A steam generator is also provided so as to generate steam which is fluidically conducted into the covered cooking chambers. In this manner, the food products are cooked as a result of the steam being conducted into the upper regions of the covered cooking chambers while the heat generated from the heated grills or platens impart heat to the lower regions of the covered cooking chambers thereby cooking the food in an accelerated manner which is extremely desirable by commercial fast-food establishments.

16 Claims, 1 Drawing Sheet

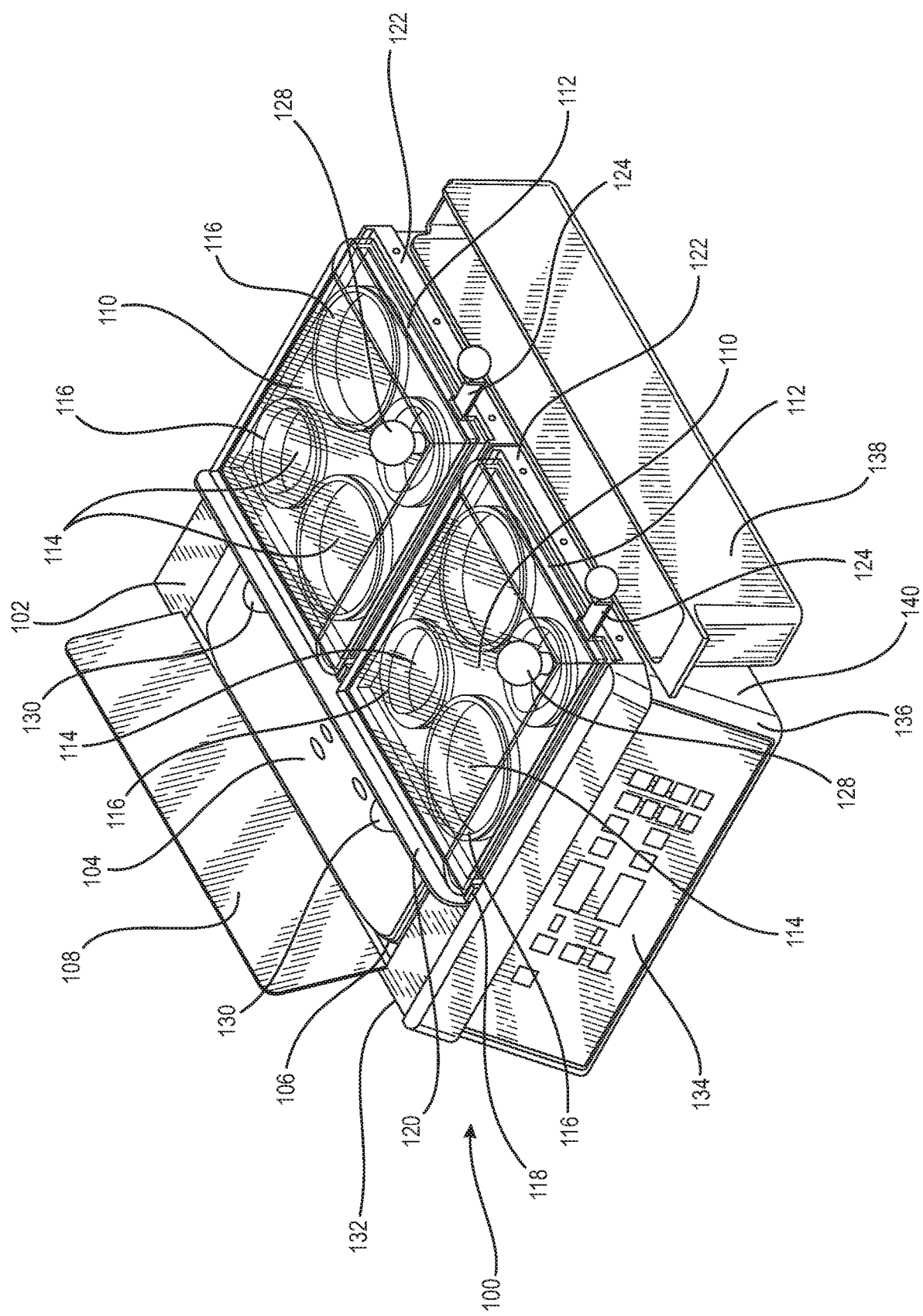

FOOD COOKING APPLIANCE UTILIZING BOTH STEAM AND HEAT FOR RAPIDLY COOKING FOOD PRODUCTS

FIELD OF THE INVENTION

The present invention relates generally to food preparation apparatus, equipment, or appliances, and more particularly to a food cooking appliance or apparatus which utilizes both steam and heat for rapidly cooking food products. The food products are disposed within food containers which are effectively formed as openings within one or more plates or templates, wherein the openings may have different geometrical configurations and size dimensions, and the one or more plates or templates are pivotally movable between upper or raised non-cooking positions and lower cooking positions at which the food products, disposed within the openings, are disposed atop one or more heated grills or platens. One or more covers are also utilized to cover the plates or templates such that the food products are cooked within covered environments or cooking chambers. A steam generator is also provided so as to generate steam which is fluidically conducted into the covered environments or cooking chambers. In this manner, the food products are cooked as a result of the steam being conducted into the upper regions of the covered environments or cooking chambers while the heat generated from the heated grills or platens impart heat to the lower regions of the covered environments or cooking chambers thereby cooking the food in an accelerated manner which is extremely desirable by commercial fast-food establishments.

BACKGROUND OF THE INVENTION

Commercial fast-food establishments, comprising the burgeoning fast-food industry, obviously require food to be cooked in a relatively short period of time so as to rapidly serve their customers in accordance with what is probably the number one reason consumers patronize fast-food establishments, namely, that the consumers know that they can receive their ordered food in a relatively quick manner or short period of time. Some fast-food cooking appliances or apparatus have in fact employed steam in some capacity as a method of cooking their food products, that is, the appliances, equipment, or apparatus used steam in conjunction with heating apparatus, however, when cooking each new batch of fast-food products, water would have to effectively be poured onto the grilling surface in order to generate the desired steam. Not only did this cooking process effectively slow down the over cooking time per batch of fresh food being prepared, but the food products were not effectively cooked in an even or balanced manner throughout the food product, that is, from top to bottom, because substantially all of the cooking heat was being generated from the underside portion of the food product. In addition, spatial considerations within a particular fast-food establishment usually mandate limited kitchen facility areas which, in turn, usually mandate the use of relatively small or compact food cooking appliances such as, for example, those that can be placed or installed upon tabletops or countertops.

A need therefore exists in the art for a new and improved food cooking appliance or apparatus wherein the aforenoted disadvantages or operational drawbacks characteristic of conventional food cooking apparatus, equipment, or appliances are effectively overcome or eliminated. More particularly, a need exists in the art for a new and improved food cooking appliance or apparatus wherein the appliance or apparatus is relatively small in size. Still more particularly, a need exists in the art for a new and improved food cooking appliance or apparatus wherein a steam generator can effectively be fluidically connected with one or more food cooking chambers so as to supply steam into the food cooking chambers. Still yet further, a need exists in the art for a new and improved food cooking appliance or apparatus wherein steam, generated from a steam generator, can be utilized in conjunction with a heated platen or grill whereby both sources of heat can effectively be utilized to cook food products. Yet further, a need exists in the art for a new and improved food cooking appliance or apparatus wherein steam, generated from a steam generator, can be utilized in conjunction with a heated platen or grill such that both sources of heat can be effectively utilized to cook food products in a relatively quick manner and a relatively shortened period of time. Yet still further, a need exists in the art for a new and improved food cooking appliance or apparatus wherein steam, generated from a steam generator, can be utilized in conjunction with a heated platen or grill such that both sources of heat can be effectively utilized to cook food products such that the cooked food products are thoroughly cooked as a result of the steam being conducted into the upper regions of the food cooking chambers while the heated platen or grill generate heat which is effectively conducted into the lower regions of the food cooking chambers.

OVERALL OBJECTIVES OF THE INVENTION

The overall objectives of the present invention are to provide a new and improved food cooking appliance or apparatus which will overcome or eliminate the aforenoted disadvantages or operational drawbacks characteristic of conventional food cooking apparatus, equipment, or appliances, to provide a new and improved food cooking appliance or apparatus which is relatively small in size, to provide a new and improved food cooking appliance or apparatus wherein a steam generator can effectively be fluidically connected with one or more food cooking chambers so as to supply steam into the food cooking chambers, to provide a new and improved food cooking appliance or apparatus wherein steam, generated from a steam generator, can be utilized in conjunction with a heated platen or grill such that both sources of heat can effectively be utilized to cook food products, to provide a new and improved food cooking appliance or apparatus wherein steam, generated from a steam generator, can be utilized in conjunction with a heated platen or grill such that both sources of heat can be effectively utilized to cook food products in an accelerated manner and thereby in a relatively shortened period of time, and to provide a new and improved food cooking appliance or apparatus wherein steam, generated from a steam generator, can be utilized in conjunction with a heated platen or grill such that both sources of heat can be effectively utilized to cook food products such that the cooked food products are thoroughly cooked as a result of the steam being conducted into the upper regions of the food cooking chambers while the heated platens or grills generate heat which is effectively conducted into the lower regions of the food cooking chambers.

SUMMARY OF THE INVENTION

The foregoing and other objectives are achieved in accordance with the teachings and principles of the present invention through the provision of a new and improved food cooking appliance or apparatus which utilizes both steam and heat for rapidly cooking food products. The food products are disposed within food containers which are effectively formed as openings within one or more plates or templates, wherein the openings may have different geometrical configurations and size dimensions. The one or more plates or templates are pivotally movable between first upper or raised non-cooking positions, and second lower cooking positions at which the food products, disposed within the openings, are disposed atop one or more heated grills or platens. One or more covers are also utilized to cover the plates or templates such that the food products are cooked within covered environments or cooking chambers. A steam generator is also provided so as to generate steam which is fluidically conducted into the covered environments or cooking chambers. In this manner, the food products are cooked as a result of the steam being conducted into the upper regions of the covered environments or cooking chambers while the heat generated from the heated grills or platens impart heat to the lower regions of the covered environments or cooking chambers. In this manner, the food is cooked in an accelerated manner which is extremely desirable by commercial fast-food establishments. In addition, the food is cooked in an even or balanced manner as a result of the steam being disposed within the upper regions of the cooking chambers while heat, generated from the heated grills or platens, impart heat to the lower regions of the cooking chambers. The cooking appliance comprises a housing which has a configuration which is substantially that of a rectangular parallelepiped wherein the steam generator is integrally mounted upon or incorporated within a first side wall portion of the housing, a user interface or control panel is integrally formed upon a second side wall portion of the housing, and a food scrap container is removably mounted upon a third side wall portion of the housing whereby food scraps, generated during the various food cooking cycles, may be collected and periodically discarded as a result of the removal of the food scrap container from the housing. The food scrap container may then, of course, be re-installed upon the housing so as to collect food scraps generated during future food cooking cycles.

BRIEF DESCRIPTION OF THE DRAWINGS

Various other features and attendant advantages of the present invention will be more fully appreciated from the following detailed description when considered in connection with the accompanying drawing wherein:

The SOLE FIGURE is a perspective view of a new and improved food cooking appliance or apparatus as constructed in accordance with the principles and teachings of the present invention and showing the cooperative parts thereof.

DETAILED DESCRIPTION OF THE PREFERRED EMBODIMENT

Referring now to the drawings, and more particularly to the SOLE FIGURE thereof, there is disclosed a new and improved food cooking appliance or apparatus which is constructed in accordance with the principles and teachings of the present invention and which is generally indicated by the reference character 100. More particularly, it is seen that the food cooking appliance or apparatus 100 comprises a housing 102 which has a configuration which is generally that of a rectangular parallelepiped. In accordance with the unique features and structure of the cooking appliance 100, the cooking appliance 100 utilizes both steam and heat for rapidly cooking food products in an accelerated manner. Accordingly, it is seen that a steam generator 104 is disposed within a steam generator housing 106 that is incorporated within a first side wall portion of the housing 102, and the steam generator housing 106 has a cover 108 pivotally mounted upon the outer edge portion of the housing 102 so as to close the steam generator housing 106 when the steam generator 104 is in operation. It is additionally seen that the appliance 100 further comprises a pair of food cooking chambers 110,110, although the appliance is obviously not limited to any specific number of food cooking chambers. Within each one of the food cooking chambers 110,110 there is disposed a plate or template 112 wherein each one of the plates or templates 112,112 is provided with four through-openings 114, although, again, the particular number of openings 114 provided within each plate or template 112 is not limited to four. It is seen that the openings 114 can have different geometrical configurations, and in addition, the openings can have different size dimensions. Still further, it is seen that each opening 114 is provided with a food containment ring 116 which effectively conforms to the size and configuration of the respective opening 114 within which the food containment ring 116 is disposed. Each one of the plates or templates 112 is pivotally mounted by means of a suit-able hinge mechanism 118 which is disposed adjacent to an upstanding partition wall 120 which effectively separates the steam generator housing 106 from the food cooking chambers 110. A pair of heated platens or grills 122,122 are disposed beneath each one of the plates or templates 112 such that when food product, such as, for example, eggs or pancake batter, are poured into the food containment rings 116, the food products will effectively be disposed atop the heated platens or grills 122,122 so as to be heated and cooked by means of the heated platens or grills 122,122. The food containment rings 116 are provided so as to contain the food product therewithin during the food cooking cycle and may accordingly be fabricated from a suitable material, such as, for example, polytetrafluoroethylene or TEFLON® or other thermoplastic material such that upon completion of the food cooking cycle, the plates or templates can be pivotally moved upwardly away from the heated platens or grills 122,122 such that the cooked food products will be readily released from the food containment rings 116, and will be disposed upon the heated platens or grills 122,122 whereby they may be removed therefrom by service personnel using a spatula or similar device. In order to facilitate the pivotal movement of the plates or templates 112,112 between their raised and lowered positions, each one of the plates or tem-plates is provided with a handle 124,124.

Continuing further, it is also seen that each one of the food cooking chambers 110,110 is provided with a cover 126 which is adapted to be disposed atop each one of the food cooking chambers 110,110 so as to render the food cooking chambers 110,110 enclosed food cooking environments. A suitable upstanding handle 128 is provided upon each one of the covers 126 so as to readily enable service personnel to remove the covers 126,126 from their positions atop the heated platens or grills 122,122 or to place the covers 126,126 upon the heated platens or grills 122,122. It is noted that when the covers 126,126 are disposed atop the heated platens or grills 122,122, the lower peripheral edge portions of the covers 126,126 are effectively seated upon the peripheral edge portions of the heated platens or grills 122,122 so as to effectively surround the peripheral edge portions of the plates or templates 112,112. The covers may be fabricated from any suitable material, such as, for example, a clear thermoplastic material, stainless steel, or the like. It is to be noted further that in accordance with a unique structural feature of the present invention, the steam generator 104 is fluidically connected to the food cooking chambers 110,110 by means of a pair of steam conduits or feed tubes 130,130 which pass through partition wall 120 and conduct steam, from the steam generator 104, into the upper regions of the enclosed food cooking chambers 110,110. In this manner, the food products, disposed within the food containment rings 116,116, are cooked in an accelerated manner by means of both the steam conducted into the upper regions of the enclosed food cooking chambers 110,110, as well as by the heat generated by means of the heated platens or grills 122,122. In addition, it is also to be noted that the food is cooked in an even or balanced manner as a result of the steam being disposed within the upper regions of the cooking chambers 110, 110 while heat, generated from the heated grills or platens 122,122, impart heat to the lower regions of the cooking chambers.

As was previously noted, the cooking appliance 100 is disposed within housing 102 which has the configuration of a rectangular parallelepiped and that the steam generator 104 is integrally mounted upon or incorporated within a first side wall portion 132 of the housing 102, a user interface or control panel 134 is integrally formed upon a second side wall portion 136 of the housing 102, and a food scrap container 138 is removably mounted upon a third side wall portion 140 of the housing 102. The user interface or control panel 134 contains various inputs for controlling the various cooking parameters of the food cooking cycle, while the food scrap container 138 is provided for collecting, food scraps, generated during the various food cooking cycles, and which may be collected by scraping the food scraps off from the heated platens or grills 122,122 at the end of each food cooking cycle. The detachability of the food scrap container 138 from the third side wall portion 140 of the housing 102 permits the collected food scraps to be periodically discarded. The food scrap container 138 may then, of course, be re-installed upon the third side wall portion 140 of the housing 102 so as to be capable of collecting food scraps generated during future food cooking cycles. The food scrap container 138 may be detachably mounted upon the third side wall portion 140 of the housing 102 by means of any suitable quick-mount fasteners, such as, for example, VELCRO® fasteners, headed fasteners and bayonet slots, and the like. It is lastly noted that the heated platens or grills 122,122 may also be utilized for cooking or grilling different types of foods, such as, for example, different types of meat or fish, such as bacon, ham, salmon, tuna, and the like.

Obviously, many variations and modifications of the present invention are possible in light of the above teachings. It is therefore to be understood that within the scope of the appended claims, the present invention may be practiced otherwise than as specifically described herein.

REFERENCE NUMBER KEY FOR INVENTION COMPONENTS

100—Food cooking appliance
102—Housing of 100
104—Steam generator
106—Steam generator housing
108—Cover for 106
110—Food cooking chamber
112—Plate or template
114—Openings in 112
116—Food containment rings
118—Hinge mechanism for 112
120—Partition wall between 106 and 110
122—Heated platen or grill
124—Handles for moving 122
126—Cover for 110
128—Handles on covers 126
130—Steam conduits connecting 106 to 110
132—First side wall portion of housing 102
134—User interface or control panel
136—Second side wall portion of housing 102
138—Food scrap container
140—Third side wall portion of housing 102

What is claimed as new and desired to be protected by Letters Patent, is:

1. A food cooking appliance or apparatus for cooking food products, comprising:
   a housing;
   at least one food cooking chamber defined within said housing for containing food to be cooked;
   at least one heated platen or grill disposed beneath said at least one food cooking chamber and upon which a food product is disposed in direct contact with said at least one heated platen so as to be cooked or grilled as a result of said at least one heated platen or grill generating heat to cook or grill the food product; and
   a steam generator mounted within said housing and fluidically connected to upper regions of said at least one food cooking chamber so as to provide steam within said upper regions of said at least one food cooking chamber in order to also cook the food product by a steaming process,
   whereby the food product is cooked within said at least one food cooking chamber as a result of being cooked both by the steam, generated by said steam generator and conducted into said upper regions of said at least one food cooking chamber, and by the heat generated by said at least one heated platen or grill disposed beneath said at least one food cooking chamber and in direct contact with the food product.

2. The food cooking appliance or apparatus as set forth in claim 1, further comprising:
   at least one plate or template disposed within said at least one food cooking chamber and having at least one through-hole defined therein; and
   a food containment ring, disposed within said at least one through-hole defined within said at least one plate or template, for containing the food product to be cooked.

3. The food cooking appliance or apparatus as set forth in claim 2, wherein:
   said food containment ring is fabricated from a thermoplastic material so as to facilitate the separation of the cooked food product from said food containment ring when the food product has been cooked.

4. The food cooking appliance or apparatus as set forth in claim 2, wherein:
   said at least one food cooking chamber comprises a pair of food cooking chambers disposed adjacent to each other within said housing.

5. The food cooking appliance or apparatus as set forth in claim 4, wherein:
   said at least one plate or template disposed within said at least one food cooking chamber comprises a pair of plates or templates respectively disposed within said pair of food cooking chambers.

6. The food cooking appliance or apparatus as set forth in claim 2, wherein:

said at least one through-hole defined within said at least one plate or template comprises a plurality of through-holes defined within said at least one plate or template.

7. The food cooking appliance or apparatus as set forth in claim 6, wherein:
   said plurality of through-holes defined within said at least one plate or template have different configurations.

8. The food cooking appliance or apparatus as set forth in claim 6, wherein:
   said plurality of through-holes defined within said at least one plate or template have different size dimensions.

9. The food cooking appliance or apparatus as set forth in claim 2, wherein:
   said at least one plate or template is pivotally movable between first raised and second lowered positions relative to said at least one heated platen or grill.

10. The food cooking appliance or apparatus as set forth in claim 9, further comprising:
    a handle fixedly mounted upon said at least one plate or template for moving said at least one plate or template between said first raised and second lowered positions relative to said at least one heated platen or grill.

11. The food cooking appliance or apparatus as set forth in claim 2, further comprising:
    a cover removably disposed atop said at least one plate or template and said at least one heated platen or grill so as to enclose said at least one food cooking chamber.

12. The food cooking appliance or apparatus as set forth in claim 1, wherein:
    said housing has the configuration of a rectangular parallelepiped.

13. The food cooking appliance or apparatus as set forth in claim 12, wherein:
    said steam generator is mounted upon a first side wall portion of said housing.

14. The food cooking appliance or apparatus as set forth in claim 12, wherein:
    a user interface or control panel is mounted upon a second side wall portion of said housing.

15. The food cooking appliance or apparatus as set forth in claim 12, wherein:
    a food scrap container, for collecting food scraps after a food cooking cycle, is mounted upon a third side wall portion of said housing.

16. The food cooking appliance or apparatus as set forth in claim 11, further comprising:
    a handle fixedly mounted upon said cover removably disposed atop said at least one plate or template and said at least one heated platen or grill.

\* \* \* \* \*